US008684270B2

(12) United States Patent
Brown et al.

(10) Patent No.: US 8,684,270 B2
(45) Date of Patent: Apr. 1, 2014

(54) RADIATION ENHANCEMENT AND DECOUPLING

(75) Inventors: James Robert Brown, Farnham (GB); Christopher Robert Lawrence, Farnborough (GB); William Norman Damerell, Richmond (GB)

(73) Assignee: OMNI-ID Cayman Limited, Grand Cayman (KY)

( * ) Notice: Subject to any disclaimer, the term of this patent is extended or adjusted under 35 U.S.C. 154(b) by 687 days.

(21) Appl. No.: 12/519,657

(22) PCT Filed: Dec. 19, 2007

(86) PCT No.: PCT/GB2007/004877
§ 371 (c)(1),
(2), (4) Date: May 20, 2010

(87) PCT Pub. No.: WO2008/075039
PCT Pub. Date: Jun. 26, 2008

(65) Prior Publication Data
US 2010/0230497 A1 Sep. 16, 2010

(30) Foreign Application Priority Data
Dec. 20, 2006 (GB) .................................. 0625342.1

(51) Int. Cl.
*G06K 19/02* (2006.01)

(52) U.S. Cl.
USPC .......................................... 235/488; 235/487

(58) Field of Classification Search
USPC .......................................... 235/488, 487, 382
See application file for complete search history.

(56) References Cited

U.S. PATENT DOCUMENTS

| | | | |
|---|---|---|---|
| 2,990,547 | A | 6/1961 | McDougal |
| 3,065,752 | A | 11/1962 | Potzl |
| 4,242,685 | A | 12/1980 | Sanford |
| 4,498,076 | A | 2/1985 | Lichtblau |
| 4,714,906 | A | 12/1987 | D'Albaret et al. |
| 4,728,938 | A | 3/1988 | Kaltner |
| 4,835,524 | A | 5/1989 | Lamond et al. |
| 4,890,111 | A | 12/1989 | Nicolet et al. |
| 5,276,431 | A | 1/1994 | Piccoli et al. |
| 5,285,176 | A | 2/1994 | Wong et al. |
| 5,557,279 | A | 9/1996 | D'Hont |

(Continued)

FOREIGN PATENT DOCUMENTS

| | | |
|---|---|---|
| EP | 0512491 | 11/1992 |
| EP | 0548851 | 12/1992 |

(Continued)

OTHER PUBLICATIONS

Hibbins, et al., "Squeezing Millimeter Waves into Microns", Physical Review Letters, vol. 92, No. 14, 2004.

(Continued)

*Primary Examiner* — Karl D Frech
(74) *Attorney, Agent, or Firm* — McDonnell Boehnen Hulbert & Berghoff LLP

(57) ABSTRACT

Apparatus capable of enhancing an incident electric field to drive an electromagnetic tag (124) into operation, comprising a resonant dielectric cavity which extends out of a single plane defined between two conducting surfaces (102, 104, 106). The cavity may extend over two or more layers, and can adopt C or S shaped or spiral profiles.

20 Claims, 16 Drawing Sheets

(56) References Cited

U.S. PATENT DOCUMENTS

| | | | |
|---|---|---|---|
| 5,565,875 | A | 10/1996 | Buralli et al. |
| 5,677,698 | A | 10/1997 | Snowdon |
| 5,682,143 | A | 10/1997 | Brady et al. |
| 5,949,387 | A | 9/1999 | Wu et al. |
| 5,973,600 | A | 10/1999 | Mosher, Jr. |
| 5,995,048 | A | 11/1999 | Smithgall et al. |
| 6,049,278 | A | 4/2000 | Guthrie et al. |
| 6,072,383 | A | 6/2000 | Gallagher, III et al. |
| 6,118,379 | A | 9/2000 | Kodukula et al. |
| 6,121,880 | A | 9/2000 | Scott et al. |
| 6,130,612 | A | 10/2000 | Castellano et al. |
| 6,147,605 | A | 11/2000 | Vega et al. |
| 6,172,608 | B1 | 1/2001 | Cole |
| 6,208,235 | B1 | 3/2001 | Trontelj |
| 6,229,444 | B1 | 5/2001 | Endo et al. |
| 6,239,762 | B1 | 5/2001 | Lier |
| 6,265,977 | B1 | 7/2001 | Vega et al. |
| 6,271,793 | B1 | 8/2001 | Brady et al. |
| 6,285,342 | B1 | 9/2001 | Brady et al. |
| 6,307,520 | B1 | 10/2001 | Liu |
| 6,339,406 | B1 | 1/2002 | Nesic et al. |
| 6,366,260 | B1 | 4/2002 | Carrender |
| 6,456,228 | B1 | 9/2002 | Granhed et al. |
| 6,483,481 | B1 | 11/2002 | Sievenpiper et al. |
| 6,507,320 | B2 | 1/2003 | Von Stein et al. |
| 6,509,880 | B2 | 1/2003 | Sabet et al. |
| 6,516,182 | B1 | 2/2003 | Smit et al. |
| 6,552,696 | B1 | 4/2003 | Sievenpiper et al. |
| 6,642,898 | B2 | 11/2003 | Eason |
| 6,646,618 | B2 | 11/2003 | Sievenpiper |
| 6,812,893 | B2 | 11/2004 | Waterman |
| 6,816,380 | B2 | 11/2004 | Credelle et al. |
| 6,825,754 | B1 | 11/2004 | Rolin |
| 6,911,952 | B2 | 6/2005 | Sievenpiper et al. |
| 6,914,562 | B2 | 7/2005 | Forster |
| 6,944,424 | B2 | 9/2005 | Heinrich et al. |
| 6,946,995 | B2 | 9/2005 | Choi et al. |
| 7,075,437 | B2 | 7/2006 | Bridgelall et al. |
| 7,212,127 | B2 | 5/2007 | Jacober et al. |
| 7,225,992 | B2 | 6/2007 | Forster et al. |
| 7,298,343 | B2 | 11/2007 | Forster et al. |
| 7,315,248 | B2 | 1/2008 | Egbert |
| 7,768,400 | B2 | 8/2010 | Lawrence et al. |
| 7,880,619 | B2 | 2/2011 | Brown et al. |
| 2001/0036217 | A1 | 11/2001 | Kopf et al. |
| 2002/0130817 | A1 | 9/2002 | Forster et al. |
| 2002/0167500 | A1 | 11/2002 | Gelbman |
| 2002/0170969 | A1 | 11/2002 | Bridgelall |
| 2002/0175873 | A1 | 11/2002 | King et al. |
| 2002/0177408 | A1 | 11/2002 | Forster et al. |
| 2003/0112192 | A1 | 6/2003 | King et al. |
| 2003/0169204 | A1 | 9/2003 | Saito |
| 2003/0197613 | A1 | 10/2003 | Hernandez et al. |
| 2004/0020036 | A1 | 2/2004 | Arneson et al. |
| 2004/0111338 | A1 | 6/2004 | Bandy et al. |
| 2004/0159158 | A1 * | 8/2004 | Forster ............................ 73/718 |
| 2004/0201522 | A1 | 10/2004 | Forster |
| 2005/0012616 | A1 | 1/2005 | Forster |
| 2005/0030201 | A1 | 2/2005 | Bridgelall |
| 2005/0092845 | A1 | 5/2005 | Forster et al. |
| 2005/0107092 | A1 | 5/2005 | Charych |
| 2005/0151699 | A1 | 7/2005 | Eastin |
| 2005/0200539 | A1 | 9/2005 | Forster et al. |
| 2006/0028344 | A1 | 2/2006 | Forster |
| 2006/0033609 | A1 | 2/2006 | Bridgelall |
| 2006/0043198 | A1 | 3/2006 | Forster |
| 2006/0049947 | A1 | 3/2006 | Forster |
| 2006/0055542 | A1 | 3/2006 | Forster et al. |
| 2006/0086808 | A1 | 4/2006 | Appalucci et al. |
| 2006/0145927 | A1 | 7/2006 | Choi et al. |
| 2006/0220866 | A1 | 10/2006 | Dixon et al. |
| 2006/0220869 | A1 | 10/2006 | Kodukula et al. |
| 2006/0261950 | A1 | 11/2006 | Arneson et al. |
| 2007/0007342 | A1 | 1/2007 | Cleeves et al. |
| 2007/0285907 | A1 | 12/2007 | Nishikawa et al. |
| 2008/0129625 | A1 | 6/2008 | Svensson et al. |
| 2010/0045025 | A1 | 2/2010 | Cote et al. |
| 2011/0037541 | A1 | 2/2011 | Brown et al. |
| 2011/0121079 | A1 | 5/2011 | Lawrence et al. |

FOREIGN PATENT DOCUMENTS

| | | |
|---|---|---|
| EP | 1018703 | 7/2000 |
| EP | 1055943 | 11/2000 |
| EP | 1280231 | 1/2003 |
| EP | 1533867 | 5/2005 |
| EP | 1538546 | 6/2005 |
| EP | 1548629 | 6/2005 |
| EP | 1548639 | 6/2005 |
| GB | 2428939 | 2/2007 |
| JP | 63 151101 | 6/1988 |
| JP | 08-084013 | 3/1996 |
| JP | 2004054337 | 2/2004 |
| JP | 2004164055 | 6/2004 |
| JP | 2005-094360 | 4/2005 |
| JP | 2005-271090 | 6/2005 |
| JP | 2005191705 | 7/2005 |
| JP | 2005-303528 | 10/2005 |
| JP | 2006157905 | 6/2006 |
| JP | 2006-311239 | 11/2006 |
| JP | 2006-324766 | 11/2006 |
| WO | WO 98/43217 | 10/1998 |
| WO | WO 99/49337 | 9/1999 |
| WO | WO 00/05674 | 2/2000 |
| WO | WO 00/21031 | 4/2000 |
| WO | WO 00/23994 | 4/2000 |
| WO | WO 00/43952 | 7/2000 |
| WO | WO 02/07084 | 1/2002 |
| WO | WO 02/07496 | 1/2002 |
| WO | WO 02/099764 | 12/2002 |
| WO | WO 03/038747 | 5/2003 |
| WO | WO 03/090314 | 10/2003 |
| WO | WO 03/092119 | 11/2003 |
| WO | WO 03/096478 | 11/2003 |
| WO | WO 2004/025554 | 3/2004 |
| WO | WO 2004/093242 | 10/2004 |
| WO | WO 2004/093246 | 10/2004 |
| WO | WO 2004/093249 | 10/2004 |
| WO | WO 2004/102735 | 11/2004 |
| WO | WO 2005/045755 | 5/2005 |
| WO | WO 2005/048181 | 5/2005 |
| WO | WO 2006/006898 | 1/2006 |
| WO | WO 2006/009934 | 1/2006 |
| WO | WO 2006/044168 | 4/2006 |
| WO | WO 2006/060324 | 6/2006 |
| WO | WO 2007/000578 | 1/2007 |
| WO | WO 2007/144574 | 12/2007 |
| WO | WO 2008/071971 | 6/2008 |
| WO | WO 2008/075039 | 6/2008 |
| WO | WO 2008/078089 | 7/2008 |
| WO | WO 2004/097731 | 6/2009 |
| WO | WO 2006/105162 | 10/2010 |

OTHER PUBLICATIONS

Otomi et al., "Expansion of RFIDtag Reading Distance with Polarized Wave Conversion Adaptor", The 2004 Kansai-Chapter Joint Convention of Institute of Electrical Engineering, Japan, Collection of Lecture Articles, Nov. 2004.

* cited by examiner

RADIATION ENHANCEMENT AND DECOUPLING

BACKGROUND OF THE INVENTION (1) Field of the Invention

This invention relates to the local manipulation of electromagnetic fields, and more particularly, but not exclusively, to the use of radiation manipulating devices to allow RF (radio frequency) tags to be mounted on materials which would otherwise impede their use.

(2) Description of the Art

RF tags are widely used for the identification and tracking of items, particularly for articles in a shop or warehouse environment. One commonly experienced disadvantage with such tags is that if directly placed on a metal surface their read range is decreased to unacceptable levels and more typically the tag cannot be read or interrogated. This is because a propagating-wave RF tag uses an integral antenna to receive the incident radiation: the antenna's dimensions and geometry dictate the frequency at which it resonates, and hence the frequency of operation of the tag (typically 866 MHz, or 915 MHz, with 860-960 MHz being the approved range for a UHF (ultra-high frequency) range tag and 2.4-2.5 GHz or 5.8 GHz for a microwave-range tag). When the tag is placed near or in direct contact with a metallic surface, the tag's conductive antenna interacts with that surface, and hence its resonant properties are degraded or—more typically—negated. Therefore the tracking of metal articles such as cages or containers is very difficult to achieve with UHF RF tags and so other more expensive location systems have to be employed, such as GPS.

UHF RFID tags also experience similar problems when applied to any surfaces which interact with RF waves such as, certain types of glass and surfaces which possess significant water content, such as, for example, certain types of wood with a high water or sap content. Problems will also be encountered when tagging materials which contain/house water such as, for example, water bottles, drinks cans or human bodies etc.

This problem is particularly true of passive tags; that is tags which have no integrated power source and which rely on incident energy for operation. However, semi passive and active tags, which employ a power source such as an onboard battery also suffer detrimental effects on account of this problem.

One way around this problem is to place a foam spacer, or mounting between the RF tag and the surface, preventing interaction of the antenna and the surface. With currently-available systems the foam spacer needs to be at least 10-15 mm thick in order to physically distance the RF tag from the surface by a sufficient amount. Clearly, a spacer of this thickness is impractical for many applications and is prone to being accidentally knocked and damaged.

Other methods have involved providing unique patterned antennas which have been designed to impedance match a particular RF tag with a particular environment.

SUMMARY OF THE INVENTION

Accordingly, a first aspect of the invention provides apparatus comprising a resonant dielectric cavity defined between conducting surfaces, adapted to enhance an electromagnetic field at the edge of one of said conducting surfaces, wherein said dielectric cavity is non-planar.

Such apparatus provides a mounting or enabling component for an EM tag or device which is responsive to the enhanced field at a mounting site adjacent to the first conducting layer, at an open edge of the cavity.

The resonant cavity advantageously decouples or isolates the electronic device from surfaces or materials which would otherwise degrade the performance of the electronic device, such as metallic surfaces in the case of certain identification tags. This property is well documented in applicant's co-pending applications PCT/GB2006/002327 and GB0611983.8, to which reference is hereby directed. These applications describe radiation decoupling of a wide range of identification tags, particularly those that rely upon propagating wave interactions (as opposed to the inductive coupling exhibited by magnetic tags). Hence our preferred embodiment involves application to long-range system tags (e.g. UHF-range and microwave-range tags, also referred to as far-field devices)

The above referenced applications describe decouplers in which a planar dielectric layer is defined between two substantially parallel conducting layers. In certain described decouplers, the first layer does not overlie the second layer in at least one area of absence. This results in a structure which can be thought of as a sub-wavelength resonant cavity for standing waves being open at both ends of the cavity. Where the cavity length is substantially half the wavelength of incident radiation, a standing wave situation is produced, ie the mounting acts as a ½ wave decoupler as defined in the aforementioned PCT/GB2006/002327.

This structure results in the strength of the electromagnetic fields in the core being resonantly enhanced: constructive interference resulting in field strengths of 50 or 100 times greater than that of the incident radiation. Advantageously, enhancement factors of 200 or even 300 or more can be produced. In more specific applications typically involving very small devices, lower enhancement factors of 20, 30 or 40 times may still result in a readable system which would not be possible without such enhancement. The field pattern is such that the electric field is strongest (has an anti-node) at the open ends of the cavity. Due to the cavity having a small thickness the field strength falls off very quickly with increasing distance away from the open end outside the cavity. This results in a region of near-zero electric field a short distance—typically 5 mm—beyond the open end in juxtaposition to the highly enhanced field region. An electronic device or EM tag placed in this area therefore will be exposed to a high field gradient and high electrical potential gradient, irrespective of the surface on which the tag and decoupler are mounted.

An EM tag placed in the region of high potential gradient will undergo differential capacitive coupling: the part of the tag exposed to a high potential from the cavity will itself be charged to a high potential as is the nature of capacitive coupling. The part of the tag exposed to a low potential will similarly be charged to a low potential. If the sections of the EM tag to either side of the chip are in regions of different electrical potential this creates a potential difference across the chip which in embodiments of the present invention is sufficient to drive it into operation. The magnitude of the potential difference will depend on the dimensions and materials of the decoupler and on the position and orientation of the EM tag.

Typical EPC Gen 2 RFID chips have a threshold voltage of 0.5V, below which they cannot be read. If the entirety of the voltage across the open end of the cavity were to appear across the chip then based on a 1 mm thick core and simple integration of the electric field across the open end, the electric field would need to have a magnitude of approximately 250V/m. If a typical incident wave amplitude at the device is 2.5V/m—consistent with a standard RFID reader system operating at a distance of approximately 5 m—then an enhancement factor of approximately 100 would be required. Embodiments in which the field enhancement is greater will afford greater read-range before the enhancement of the incident amplitude becomes insufficient to power the chip In such a decoupler, conveniently the length of the second conductor layer is at least the same length as the first conductor layer. More preferably the second conductor layer is longer than the first conductor layer.

Preferably a tag is mounted or can be mounted on a mounting site substantially over the area of absence. The electromagnetic field may also be enhanced at certain edges of the dielectric core layer, therefore conveniently the mounting site may also be located on at least one of the edges of the dielectric core layer which exhibits increased electric field.

RF tags may be designed to operate at any frequencies, such as for example in the range of from 100 MHz up to 600 GHz. In a preferred embodiment the RF tag is a UHF (Ultra-High Frequency) tag, such as, for example, tags which have a chip and antenna and operate at 866 MHz, 915 MHz or 954 MHz, or a microwave-range tag that operates at 2.4-2.5 GHz or 5.8 GHz.

The area(s) of absence are described as being small, discrete crosses, or L-shapes but more conveniently are slits wherein the width of the slit is less than the intended wavelength of operation. A slit may be any rectilinear or curvilinear channel, groove, or void in the conductor layer material. The slit may optionally be filled with a non conducting material or further dielectric core layer material.

The described structure can therefore act as a radiation decoupling device. First and second conductor layers sandwich a dielectric core. Where the first conductor layer contains at least two islands i.e. conducting regions separated by an area of absence or a slit, preferably the one or more areas of absence is a sub-wavelength area of absence (i.e. less than $\lambda$ in at least one dimension) or more preferably a sub wavelength width slit, which exposes the dielectric core to the atmosphere. Conveniently, where the area of absence occurs at the perimeter of the decoupler to form a single island or where at least one edge of the dielectric core forms the area of absence then said area of absence does not need to be sub wavelength in its width.

It is noted that the sum thickness of the dielectric core and first conductor layer of the decoupler structure may be less than a quarter-wavelength in its total thickness, and is therefore thinner and lighter compared to prior art systems. Selection of the dielectric layer can allow the decoupler to be flexible, enabling it to be applied to curved surfaces.

The length G of the first conductor layer of certain described decouplers is determined by $\lambda \approx 2$ nG, where n is the refractive index of the dielectric, and $\lambda$ is the intended wavelength of operation of the decoupler. Clearly this is for the first harmonic (i.e. fundamental) frequency, but other resonant frequencies may be employed.

Conveniently it may be desirable to provide a decoupler with length G spacings that correspond to harmonic frequencies other than the fundamental resonant frequency. Therefore the length G may be represented by $\lambda \approx (2\text{ nG})/N$ where N is an integer (N=1 indicating the fundamental). In most instances it will be desirable to use the fundamental frequency as it will typically provide the strongest response, however harmonic operation may offer advantages in terms of smaller footprint, lower profile and enhanced battery life even though it's not idealised in performance terms.

Considering the dielectric cavity of other described decouplers, the first layer and the second layer are electrically connected at one edge, locally forming a substantially "C" shaped section. This results in a structure which can be thought of as a sub-wavelength resonant cavity for standing waves being closed at one end of the cavity. Where the cavity length is substantially a quarter the wavelength of incident radiation, a standing wave situation is produced, ie the mounting acts as a ¼ wave decoupler as defined in the aforementioned GB0611983.8

In such a decoupler, the two conductor layers can be considered to form a cavity structure which comprises a conducting base portion connected to a first conducting side wall, to form a tuned conductor layer, and a second conducting side wall, the first conducting side wall and second conducting side wall being spaced apart and substantially parallel.

The conducting base portion forces the electric field to be a minimum (or a node) at the base portion and therefore at the opposite end of the cavity structure to the conducting base portion the electric field is at a maximum (antinode). An electronic device or EM tag placed in this area therefore will be located in an area of strong field, irrespective of the surface on which the tag and decoupler are mounted.

Conveniently, the first conducting side wall has a continuous length of approximately $\lambda_d/4$ measured from the conducting base portion, where $\lambda_d$ is the wavelength, in the dielectric material, of EM radiation at the frequency of operation v.

Both the ½ and ¼ wave decouplers described above comprise a tuning conductor layer and a further conductor layer; preferably this further conductor layer is at least the same length as the tuning conductor layer, more preferably longer than the tuning conductor layer.

The two conductor layers are separated by a dielectric layer. They may be electrically connected at one end to create a closed cavity ¼ wave decoupler as hereinbefore defined, or contain conducting vias between the two conductor layers in regions of low electric field strength. However, there should be substantially no electrical connections between the two conductor layers in regions of high electric field strength or at the perimeter of the decoupler for open ended ½ wave versions, or at more than one end or perimeter for ¼ wave (closed end) versions.

It is noted that for a metallic body which is to be tracked by RFID, that at least one of the conductor layers of the decoupler can be part of said metallic body. RF tags generally consist of a chip electrically connected to an integral antenna of a length that is generally comparable with (e.g. $1/3^{rd}$ of) their operational wavelength. The present inventors have found that tags having much smaller and untuned antennas (i.e. which would not normally be expected to operate efficiently at UHF wavelengths) can be used in conjunction with decoupling components as described herein. Usually tags with such 'stunted' antennas (sometimes referred to as low-Q antennas, as will be appreciated by one skilled in the art) possess only a few centimeters or even millimeters read range in open space. However, it has surprisingly been found that using such a tag with a low-Q antenna mounted on a decoupler of the present invention may be operable and exhibit useful read ranges approaching (or even exceeding) that of an optimised commercially-available EM tag operating in free space without a decoupler. Low-antennas may be cheaper to manufacture, and may occupy less surface area (i.e. the antenna length of such a tag may be shorter than is usually possible) than a conventional tuned antenna. Therefore the EM tag may be a low Q-tag, i.e. an EM tag having a small, untuned antenna. Conveniently the device will incorporate a low Q antenna, such that upon deactivation of the decoupler the read range of the low Q tag is caused to be that of a few centimeters or even millimeters.

In order to allow progressively smaller items to be tagged or monitored, it is desirable for the size of a decoupler to be reduced. Although the decouplers described in the above referenced applications can be made 'stunted' or low-Q tags, with the largest dimension only a half and a quarter of a wavelength respectively (at the intended frequency of operation) there is a demand to reduce this dimension further still.

In embodiments of the present invention, a standing wave is set up in the cavity as described above, but the cavity is not constrained to be monoplanar, that is, to extend only in a single plane or layer (which may be straight or curved), defined between substantially parallel upper and lower surfaces. Instead the cavity can extend beyond such surfaces, and in this way the cavity can be bent or folded at an angle. This arrangement allows a cavity having a given length or dimension, corresponding to an intended frequency of operation to occupy a smaller footprint, at the expense of increased thickness. Since the overall thickness remains small, and significantly less than arrangements employing 'spacers', such a device may have advantageous dimensions when absolute thickness is not critical.

Preferably the cavity comprises two or more layers, with each layer preferably being defined at least partially between a pair conducting walls, conveniently, each layer being offset. Preferably the layers are substantially parallel, and this arrangement advantageously allows the component to be built up in a laminated structure, with adjacent layers of dielectric being separated by a single conducting wall or surface.

Alternatively, the layers are not parallel, but are arranged at angles to one another. This allows for a corrugated or rippled effect.

In certain embodiments, the cavity defines a unique path length. In this way the cavity can be considered to be formed of a single plane, but bent or folded to change its physical configuration but not its topology. The cavity of such an embodiment therefore does not include any branches or junctions, and a single unique length for the cavity can be defined, which length is associated with the frequency of radiation at which enhancement occurs.

Alternatively, the cavity may be branched, and define a number of lengths, each corresponding to a frequency of enhancement.

In this specification, when referring to path lengths, the structure of a decoupler is assumed to have uniform width, unless otherwise stated. The path length is most easily understood by considering the cross section of a device, and is explained in greater detail below, with reference to the accompanying drawings.

A further aspect of the invention provides a mounting component for an electronic device comprising a first dielectric layer arranged between first and second conductor layers, and a second dielectric layer arranged between said second conductor layer and a third conductor layer, said first and third conductor layers being electrically connected at one end, thereby defining a first dielectric connecting region, joining said first and second dielectric layers, wherein said mounting component is adapted to enhance an electromagnetic field at a mounting site at an open edge of said third conductor layer.

The invention extends to methods apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

DESCRIPTION OF THE DRAWINGS

Preferred features of the present invention will now be described, purely by way of example, with reference to the accompanying drawings, in which.

DESCRIPTION OF THE INVENTION

Figure 1A:
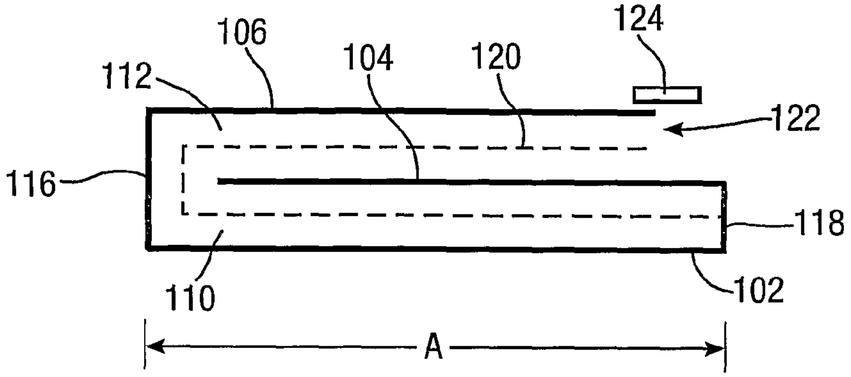
FIGS. 1*a* & 1*b* illustrate two layer components

FIG. 1*a* illustrates a cross section of a quarter wave component with the dielectric cavity formed on two layers. The layers are defined between conducting sheets 102, 104, 106, with the bottom dielectric layer 110 between sheets 102 and 104, and the upper dielectric layer 112 between sheets 104 and 106. At the left hand end of the decoupler as viewed, conducting sheets 102 and 106 extend beyond sheet 104, and are electrically connected by an end wall 116. This arrangement results in the two dielectric layers being joined at this end.

The structure is uniform in the width direction into the plane of the paper as viewed, with the dielectric and conducting sheets exposed at the sides of the structure.

The path length 120, is an approximation of the effective length of the cavity for the purposes of the wavelength of radiation which forms a standing wave in the cavity. In FIG. 1*a* it is shown formed from three straight sections joined at right angles in a 'C' shape, however it will be understood that a standing wave formed in this cavity will not be governed by such a rigid geometry. It can nevertheless be seen that the structure of FIG. 1*a* can be considered as a single layer decoupler, having approximately twice the length 'A' folded over upon itself singly.

The component of FIG. 1*a* is a quarter wave decoupler, as end portion 118 causes a standing wave in the cavity to be at a minimum value of electric field adjacent to it, with a maximum value of electric field enhanced relative to the free-space-wave value, indicated at 122. Region 122 can be considered, and is described in the earlier referenced applications as an area of absence of conductor 106, which does not extend as far as conductors 104 and 102. This region acts as a mounting site for an electronic device such as an RFID tag 124 which will experience electric field enhancement.

Figure 1B:

An equivalent half wave version is shown in FIG. 1*b*, with an open end 130.

Figure 2:
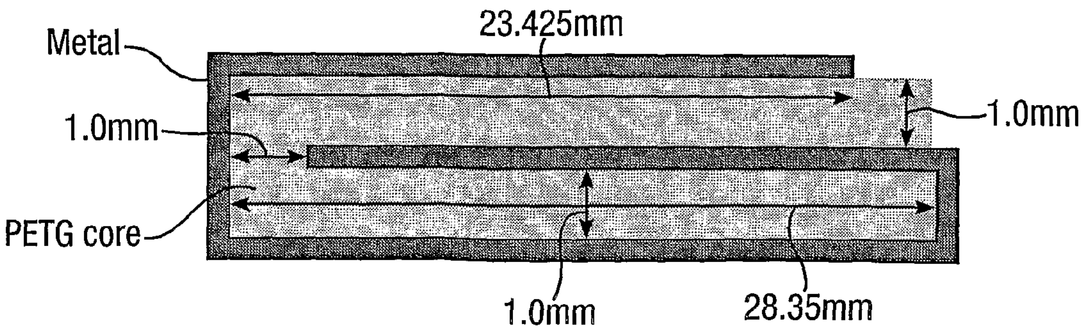
FIG. 2 shows a detailed embodiment of a two layer component

FIG. 2 is a more detailed illustration of a component having the general arrangement of FIG. 1*a*, with a PETG dielectric core, and with 75 micron thick aluminium conducting sheets. If we consider the path length as indicated in FIG. 1*a*, then the path length of FIG. 2 can be seen to be approximately 51.8 mm, which corresponds to a quarter of a wavelength (with a refractive index of approx. 1.8 for PETG) of a resonant wave at approximately 805 MHz.

Figure 3:
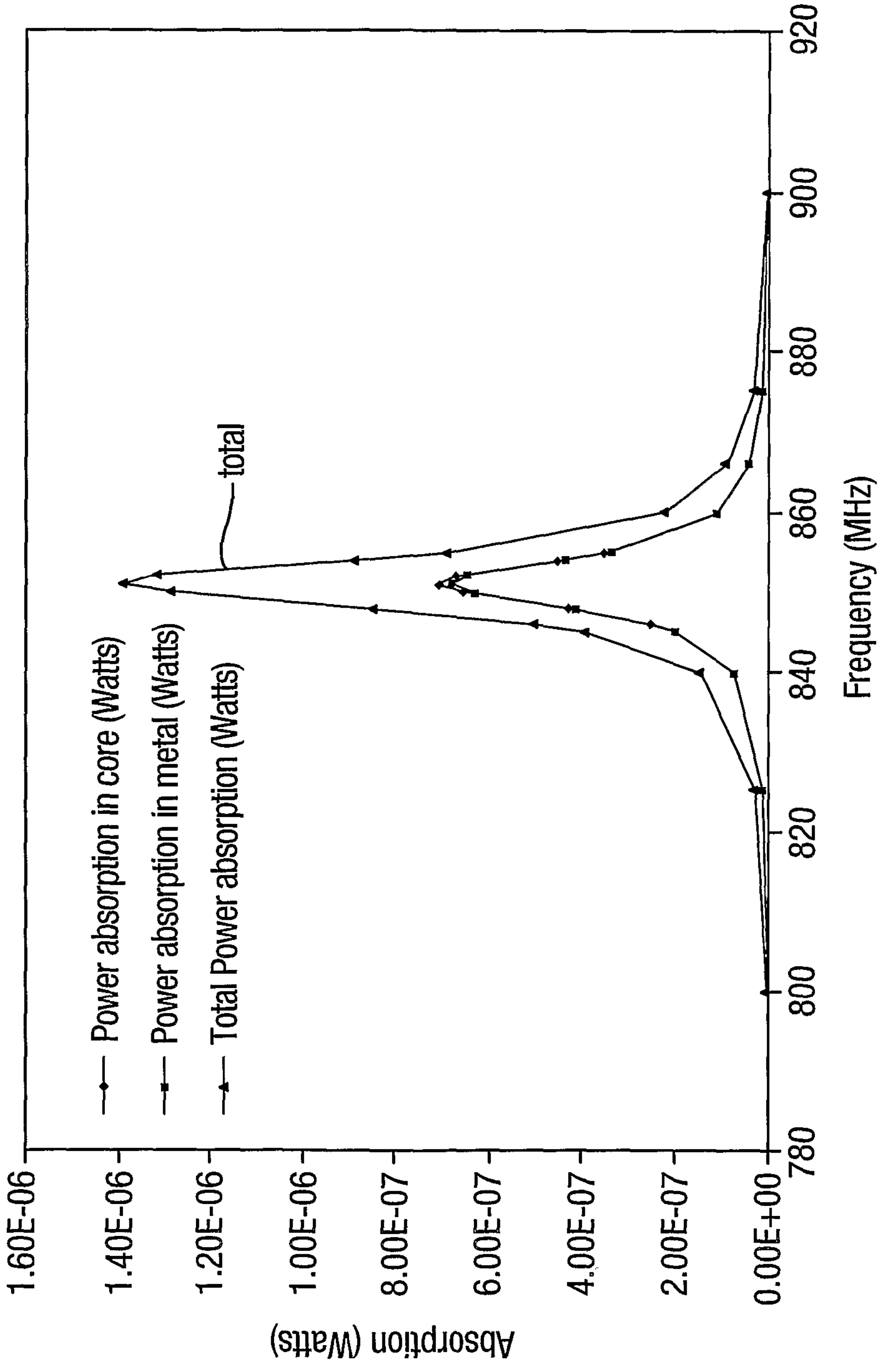
FIGS. 3 & 4 illustrate physical properties of the embodiment of FIG. 2

FIG. 3 is a plot of the absorption produced by the component of FIG. 2. Greater absorption results from stronger electromagnetic fields which peak at resonance by definition, thus FIG. 3 reveals the resonant frequency of the component. It can be seen that the resonance is centred on approximately 850 MHz. Although this is greater that the theoretical approximation of 805 MHz derived above, it confirms that the effective length of the resonant cavity has been extended well beyond the external length of the decoupler by virtue of the two layer 'folded' structure.

Figure 4:
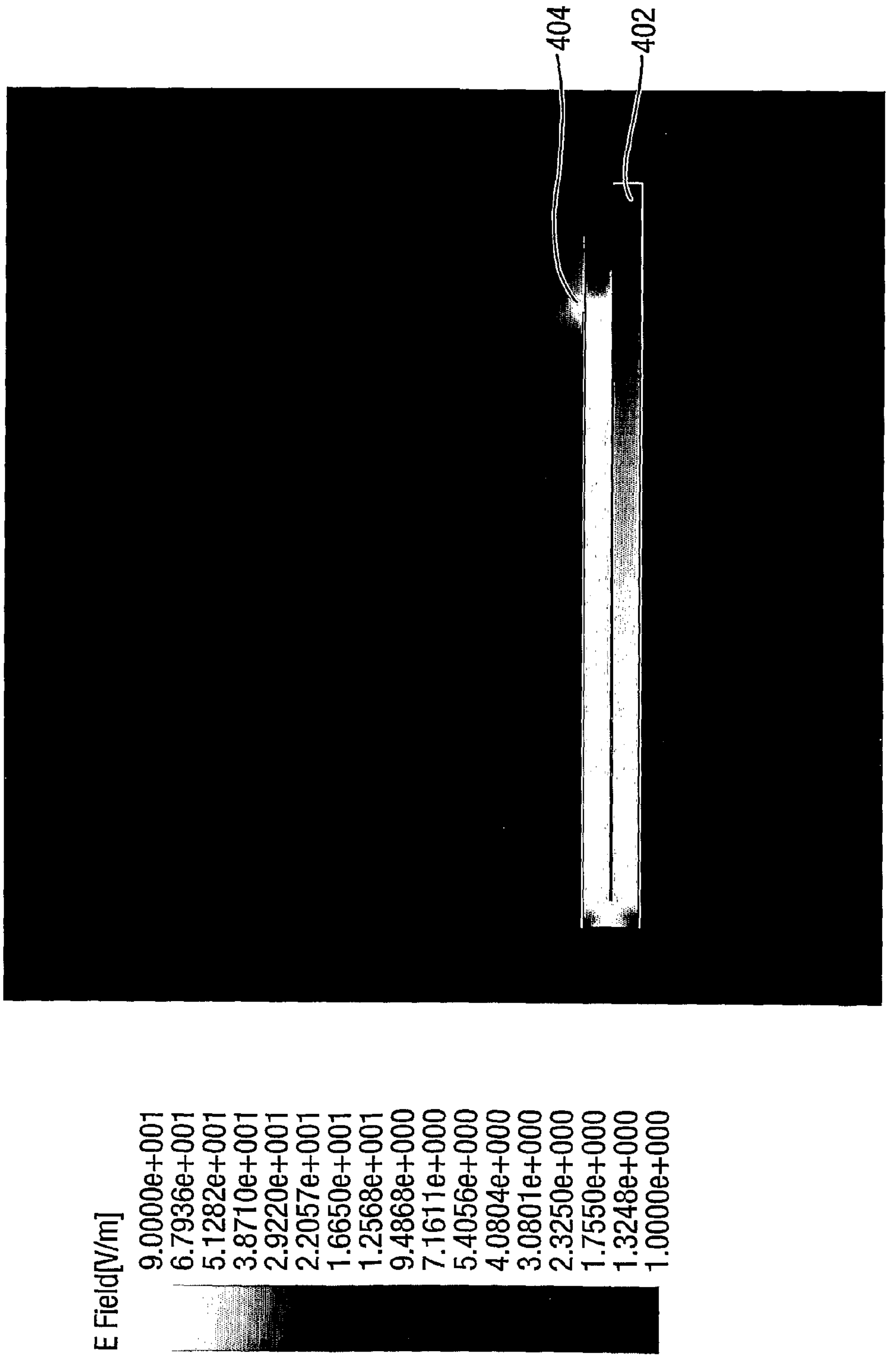

FIG. 4 is a plot of the electric field strength in the core of the component of FIG. 2 at 851 MHz. It can be seen that the field strength gradually increases along the path length, from the closed end 402 of the lower layer to a maximum at the edge 404 of the upper layer. Here the electric filed is enhanced by a factor of greater than 25 relative to the free space incident wave value of 1V/m.

Figure 5A:
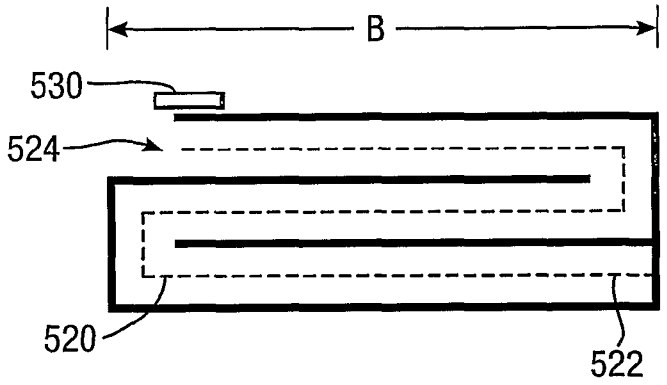
FIGS. 5*a* & 5*b* illustrate three layer components
Figure 5B:

FIG. 5*a* shows an extension of the arrangement of FIG. 1*a*, having three dielectric layers and four conducting sheets. Here the dielectric layers are joined at alternate ends, resulting in a reverse 'S' shaped path length 520, extending from closed end 522 to the open end and enhancement region 524, where a tag 530 may be mounted. Hence the component of FIG. 5*a* can be thought of as a decoupler of approximately three times length B, folded twice upon itself. FIG. 5*b* shows an equivalent arrangement for a half wave decoupler, having an open end at 526.

Thus for a given frequency of operation, the arrangements of FIGS. 5*a* and 5*b* result in a component having approximately a third of the overall length of the equivalent single layer device, but having increased overall thickness. Nevertheless, such three layer devices can still exhibit thickness of the order of 1 mm or less.

Figure 6:
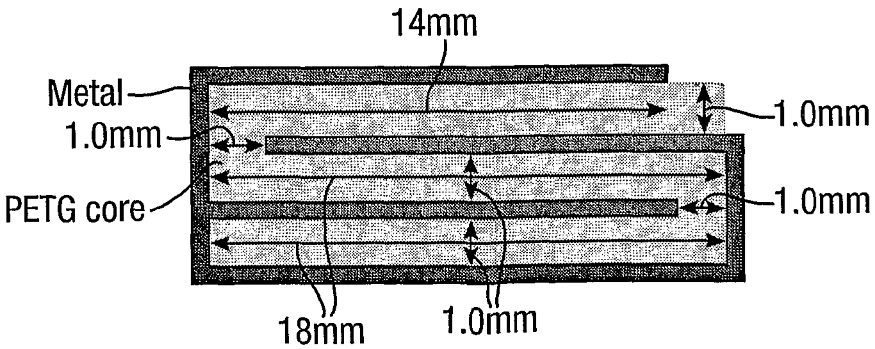
FIG. 6 is a detailed embodiment of a three layer component
Figure 7:
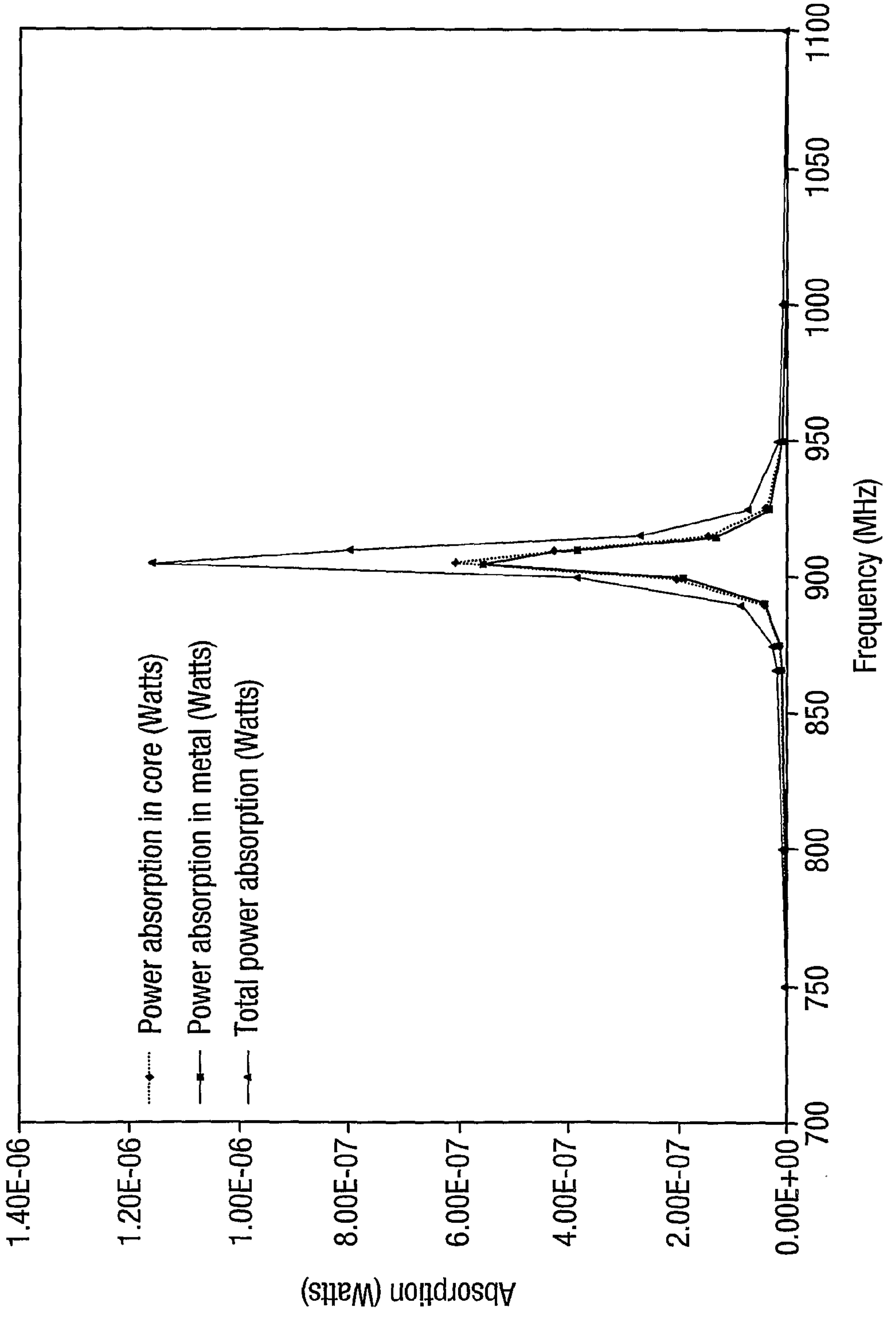
FIGS. 7 & 8 illustrate physical properties of the embodiment of FIG. 6
Figure 8:
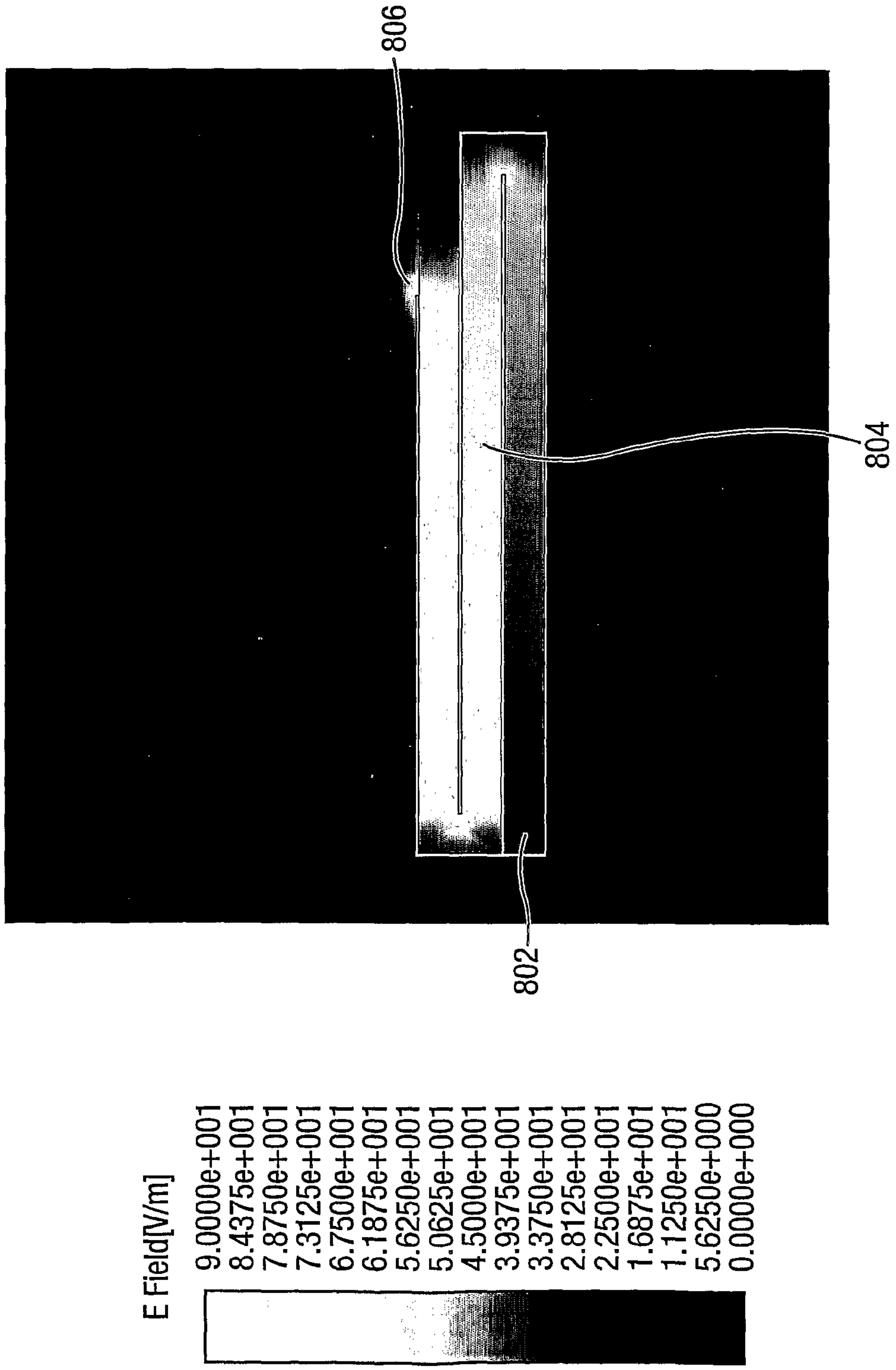

A specific implementation of the general arrangement of FIG. 5*a* is shown in FIG. 6, and characteristics of this implementation are illustrated in the plots of FIGS. 7 and 8. As with FIG. 2, this implementation is formed of a PETG dielectric core, and with 75 micron thick aluminium conducting sheets Considering an approximate path length arrangement as indicated in FIG. 5*a*, then the path length of FIG. 6 can be seen to be approximately 50 mm, which corresponds to a quarter of a wavelength (with a refractive index of approx. 1.8 for PETG) of a resonant wave at approximately 833 MHz.

From the plot of FIG. 7, which is analogous to that of FIG. 3, it can be seen that the resonance is centred on approximately 905 MHz. Again this is greater that the theoretical value of 805 MHz, and implies that the effective length of the three layer structure is in fact less than the simple straight line approximation above, but it is confirmed that the multilayered structure allows resonance of a wavelength significantly greater than the overall dimensions of the device.

FIG. 8 is a plot of the electric filed strength in the core of the decoupler of FIG. 6 at 905 MHz. Again it can be seen that the field strength gradually increases along the path length, from a minimum at the closed end of the lower layer 802, through the middle layer 804 to a maximum at the open edge 806 of the upper layer. Here, electric field enhancement by a factor of approximately 75 occurs.

Figure 9:
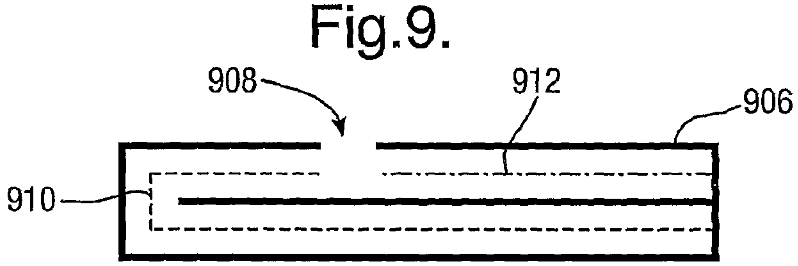
FIG. 9 shows a two layer component having multiple path lengths
Figure 10:
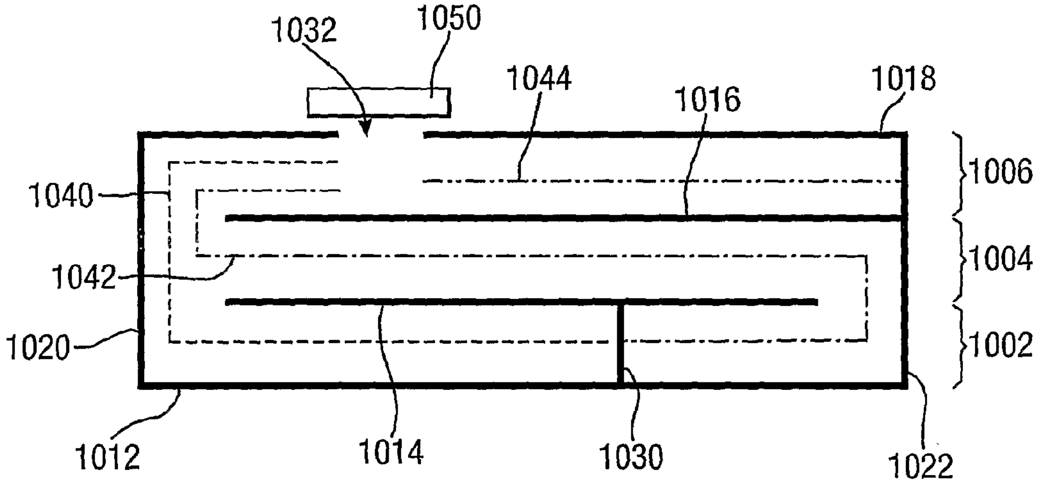
FIG. 10 shows a three layer component having multiple path lengths.

In the above described embodiments, the cavity, although folded back on itself, has a unique path length. FIGS. 9 and 10 illustrate embodiments having multiple path lengths.

FIG. 9 illustrates a two dielectric layer arrangement in which the dielectric layers are joined at one edge of the structure. The uppermost conducting sheet 906 has an aperture or area of absence 908 in the form of a slot extending across the width of the structure (into the plane of the page as viewed), causing the upper dielectric layer to have an open end at a point midway along the structure, as opposed to the arrangement of FIG. 1*a* where the upper layer is open at the edge of the structure. The arrangement of FIG. 9 can therefore be thought of as a two layer decoupler in which the top layer of the dielectric cavity extends only part way along the structure, having a path length shown as 910, together with a single layer decoupler extending along the remainder of the upper layer, and having a path length shown as 912. If we consider the structure as having two sub-cavities, both sub-cavities will act to enhance an incident electric field at a mounting site in the vicinity of aperture 908 but at different frequencies/wavelengths.

This structure therefore acts as a dual frequency, or broadband decoupler with the frequencies of enhancement being determined by the various effective lengths defined by the dielectric cavity.

A more complex arrangement is shown in FIG. 10. Here, three dielectric layers 1002, 1004 and 1006 are separated by four conducting sheets 1012, 1014, 1016 and 1018. Conducting end portions 1020 and 1022 enclose the full thickness of the structure at either end. Conducting sheet 1014 separating the lower and middle dielectric layers does not extend fully to either end portion 1020, 1022, thereby joining the lower and middle dielectric layers at both ends. An upright conducting portion 1030 however is located part way along the lower dielectric layer, forming a closed end on either side. This closed end forces a standing wave in the cavity to have a minimum value of electric field in the known fashion for a quarter wave device, and therefore defines the end of a path length.

Sheet 1016 extends to contact end portion 1022, but not portion 1020, thereby joining the middle and upper dielectric layers only at one end. Sheet 1018 has an aperture 1032 part way along its length, thereby defining an open end, and thus a path length end.

It can be seen that three path lengths exist in this structure. Path 1040 defines a 'C' shape and extends part way along the upper and lower dielectric layers. Path 1042 extends at least partly along all three layers and defines an 'S' shape, and path 1044 extends along the upper dielectric layer only.

A tag 1050 placed over aperture 1032 will therefore experience enhancement of incident electric fields at multiple frequencies determined by the geometry of the structure described above.

Figure 11:
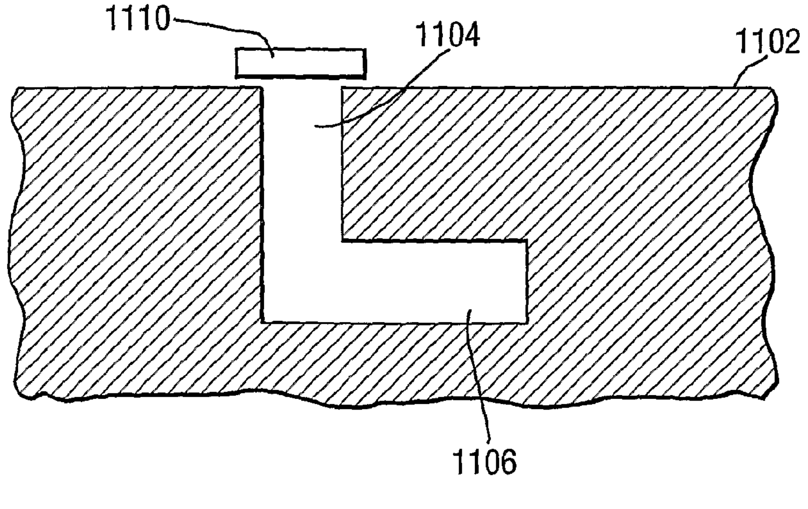
FIG. 11 shows an 'L' shaped component

In FIG. 11, a dielectric cavity extends into a solid conducting surface 1102. The cavity is formed of a portion 1104 extending perpendicular to the surface, and a portion 1106 substantially parallel to the surface. In this way, the arrangement is analogous to a quarter wave decoupler 'bent' at right angles, with a device 1110 placed at the surface opening of the cavity experiencing electric field enhancement of incident radiation at a frequency dependent upon the effective length of the cavity.

Figure 12A:
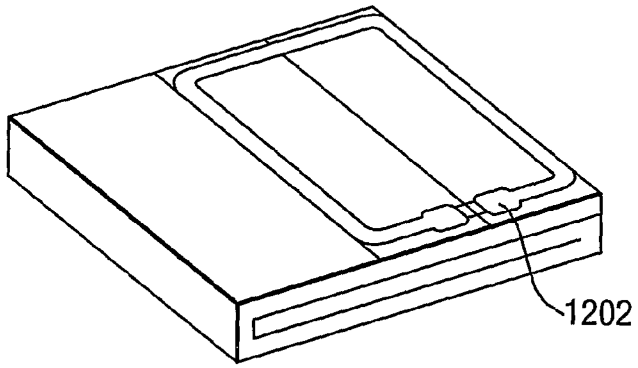
FIGS. 12, 13 and 14 illustrate the configuration, field enhancement properties and chip voltage of a three layered spiral device.
Figure 12B:
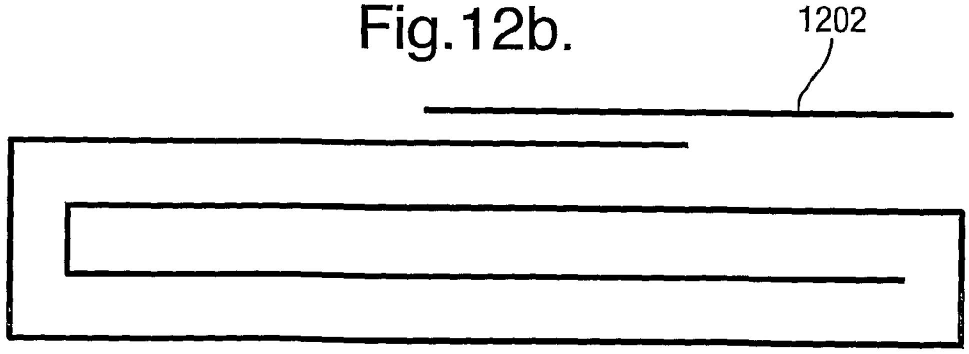

A 3-layer dielectric cavity structure in which the cavity is folded one way then back on itself the other way, as shown in FIGS. 5, 6 and 8, creates a working design. It is also possible however to create a 3-layer device which appears as a spiral in cross-section—the cavity is folded over one way then folded over again the same way such a design is shown in FIGS. 12*a* and 12*b*. This has the same footprint as the former 3-layer structure but may offer manufacturing advantages. The chip and loop arrangement, or low Q tag, is shown at 1202 extending partially over the upper conducting plane, and partially over the exposed dielectric, or area of absence of the conducting plane. In FIG. 12*b* the chip and loop is shown significantly spaced apart from the upper plane, for clarity. In reality the chip and loop may be separated and electrically isolated from the upper plane only by a thin polyester spacer of the order 0.05 mm in thickness. The loop in this example is approximately 12 mm by 18 mm in plan.

Figure 13:
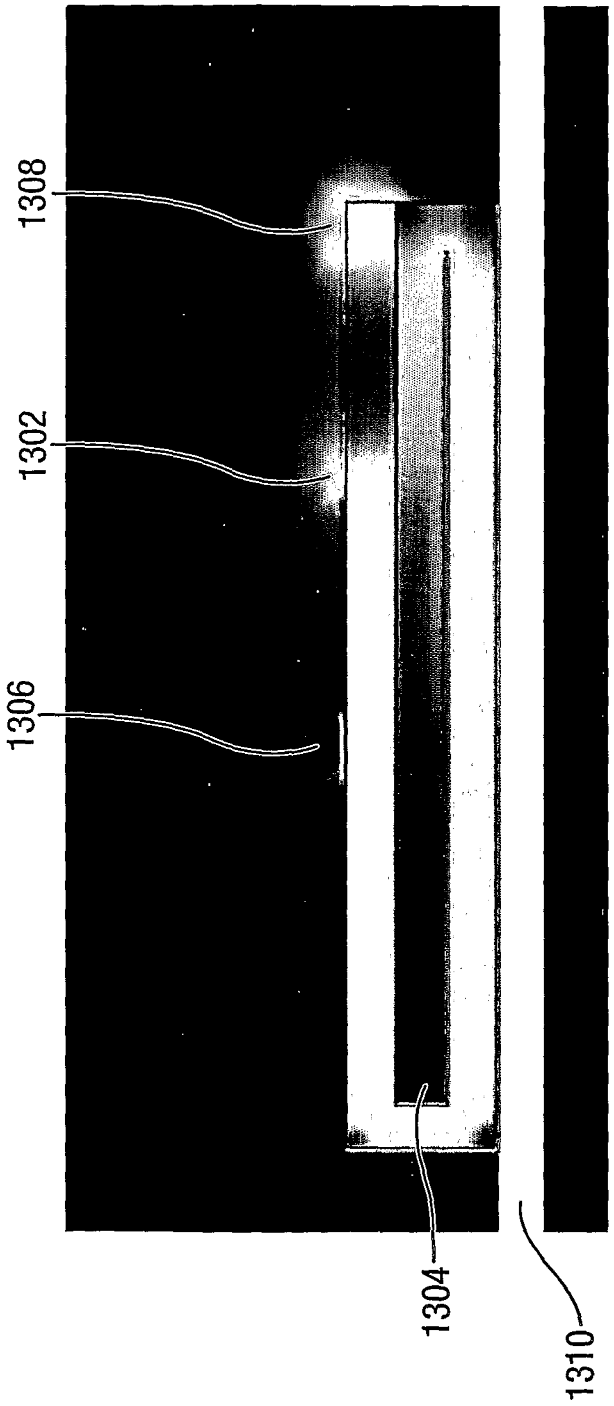

A cross-section through the 3-layer spiral structure of FIG. 12 is shown in FIG. 13, illustrating the magnitude of the electric field on a sectional plane. In previous FIGS. 4 and 8, plots of the electric field were used to demonstrate the field-enhancing effect of the cavity, with FIGS. 3 and 7 then demonstrating that the cavity is resonating at a tailored frequency by plotting the power absorbed by the structure as a function of frequency: the power absorbed is proportional to the square of the field strength hence greater absorption equates to greater field strength.

An alternative approach is employed in FIG. 13 with the coupling element included in the model, lying substantially over the upper conducting plane as explained above. This allows the voltage across the chip as a function of frequency to be calculated which is arguably a more straightforward measure of performance of the device.

Figure 14:
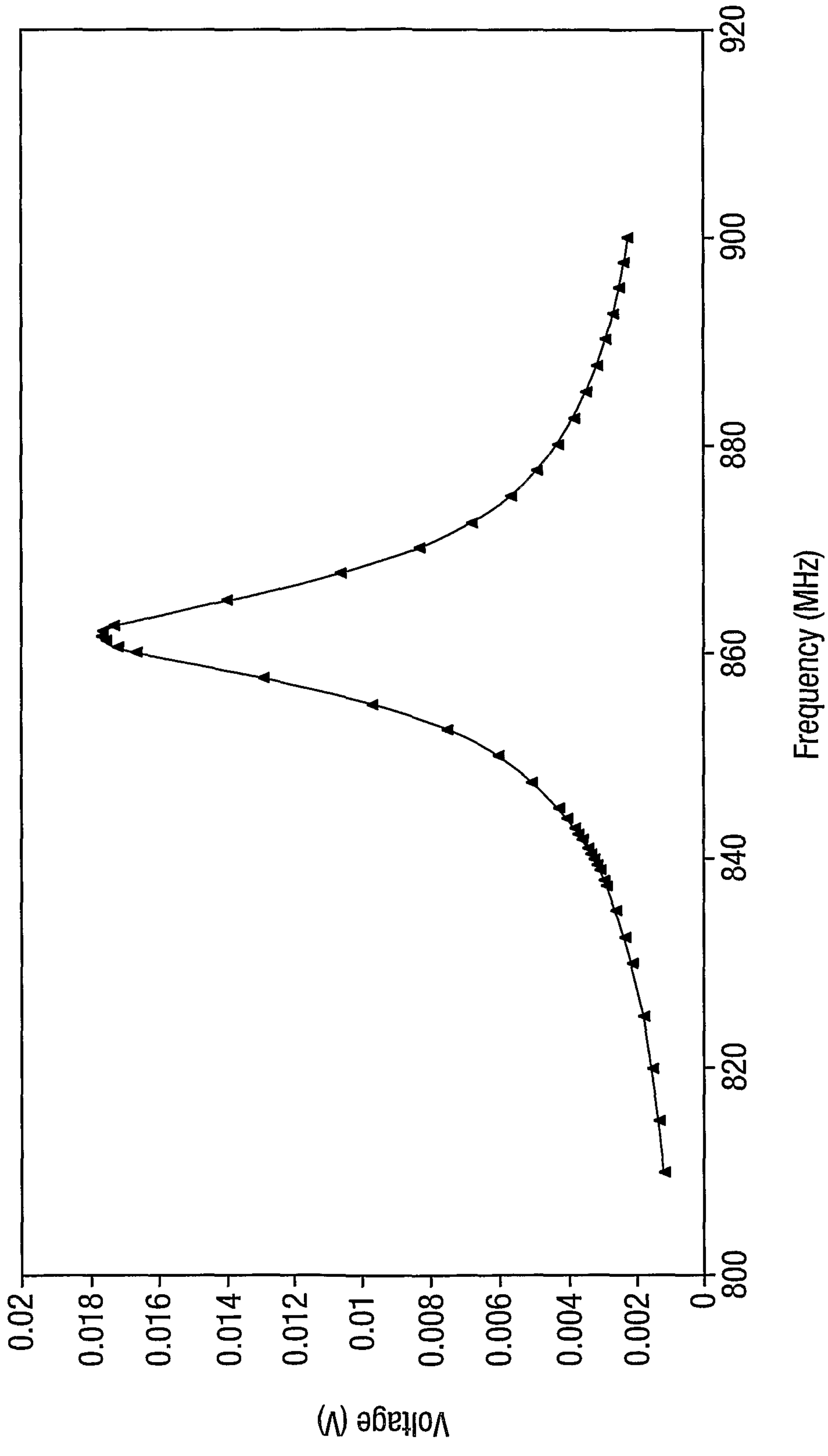

Turning to FIG. 13 then, the region of strongest electric field occurs at the open end of the cavity 1302. The scale runs from 0 V/m (black) to 170 V/m (white)—it can be seen therefore that the field has been enhanced by a factor of approximately 170 as the incident wave amplitude was set to 1 V/m. The field goes to zero at the closed end of the cavity 1304. There are further regions of high electric field along the long edges of the loop (1306, 1308) which demonstrate the coupling between the cavity structure and the loop. The structure is mounted on a solid metal plate which appears white as the field has not been plotted on its surface (1310). The magnitude of the voltage across the chip as a function of frequency is shown in FIG. 14: the curve demonstrates resonant behaviour and is centred around 862 MHz.

It can also be seen in FIG. 13 that a localised area of high field strength exists at the first 'corner' encountered by the cavity starting from the closed end, ie. at the edge of the conducting layer separating the first and second layers of the cavity, and around which the cavity is folded. It is therefore possible that an EM device or tag could exploit differential capacitive coupling, and be driven into operation, at this region in addition to region 1302.

Figure 15A:
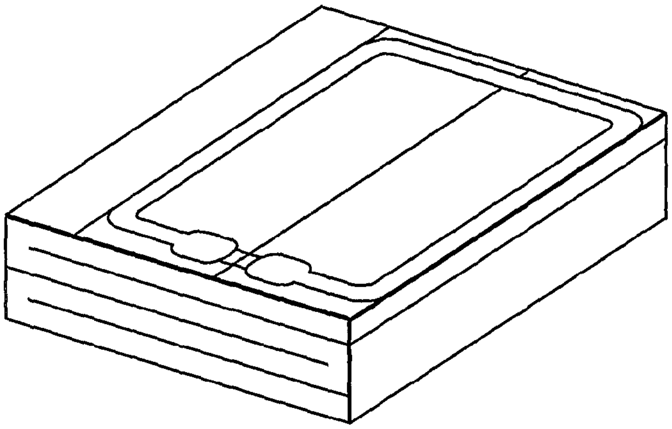
FIGS. 15 to 20 similarly illustrate two possible four layer devices.
Figure 15B:
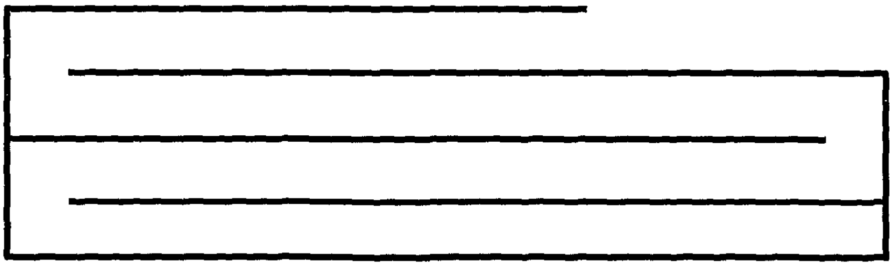
Figure 16:
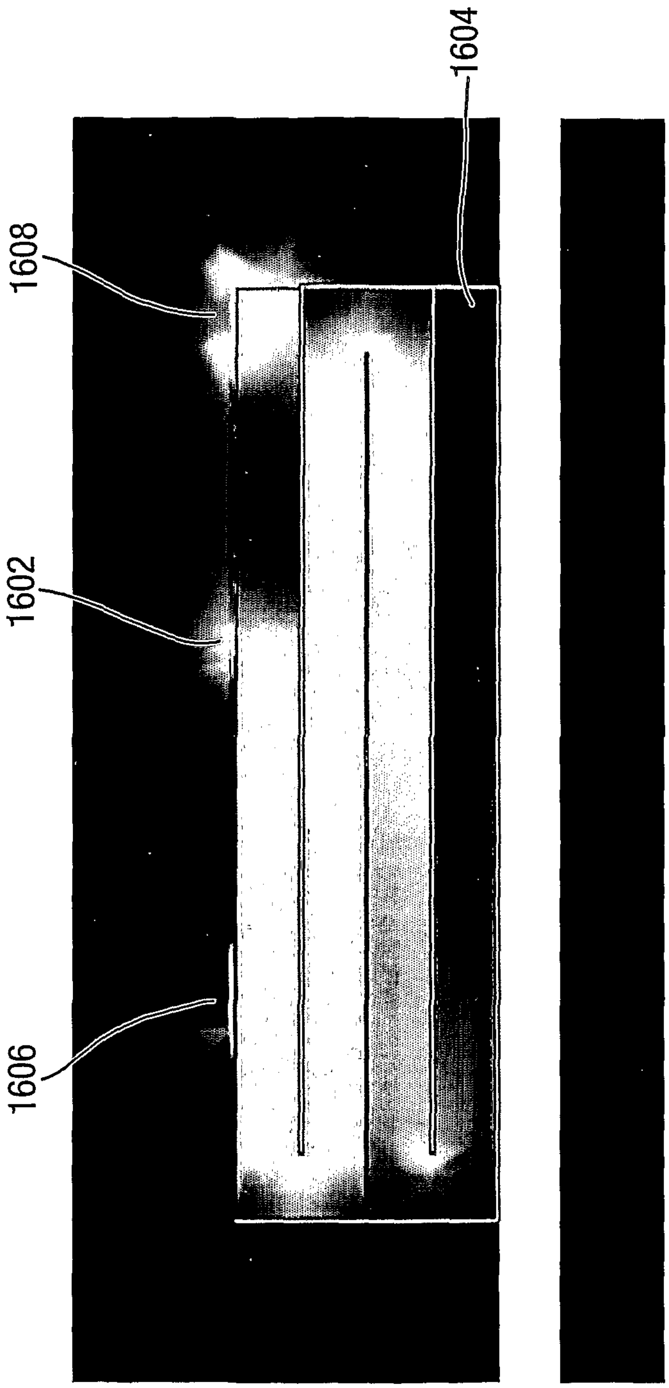

To illustrate that further number of dielectric layers are possible, FIGS. 15*a* and 15*b* show a four dielectric layer device, with the layers in an M shape. Such a device resonates with incident radiation having a wavelength four times the total length of the cavity (ie roughly 16 times the overall length of the device), resulting in a region of strongly enhanced electric field at the open end of the cavity (1602 in FIG. 16) It is noted that the chip and loop extends a proportionally greater distance across the length of the device, which has been reduced compared to FIG. 13 by an additional 'fold' of the dielectric cavity. The field is close to zero at the closed end 1604, and regions of high electric field again exist along the long edges of the loop (1606, 1608)

Figure 17:
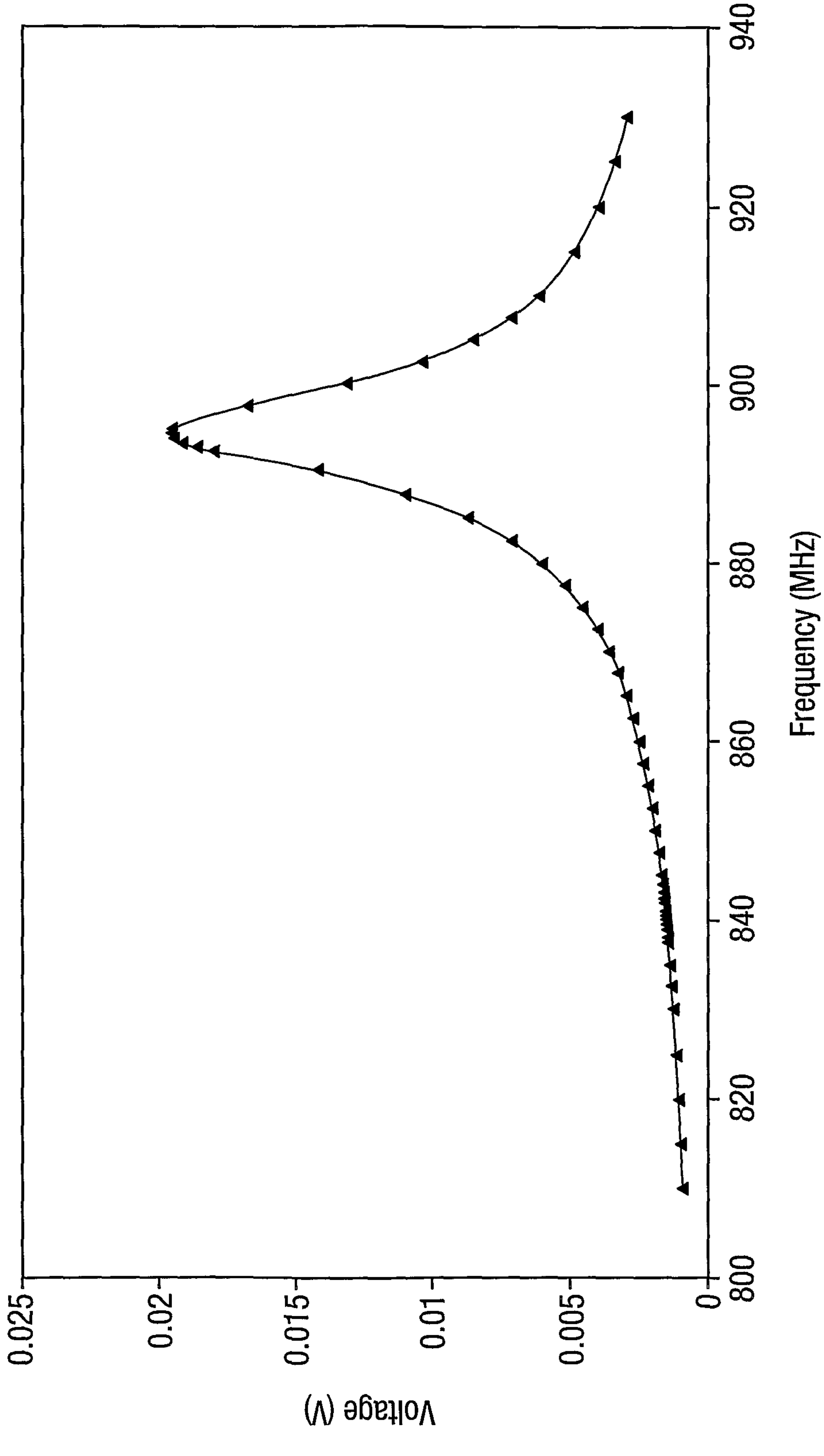

The resonance clearly visible from the plot of the electric field magnitude results in the voltage across the chip showing a resonant response as expected, as shown in FIG. 17.

Figure 18A:
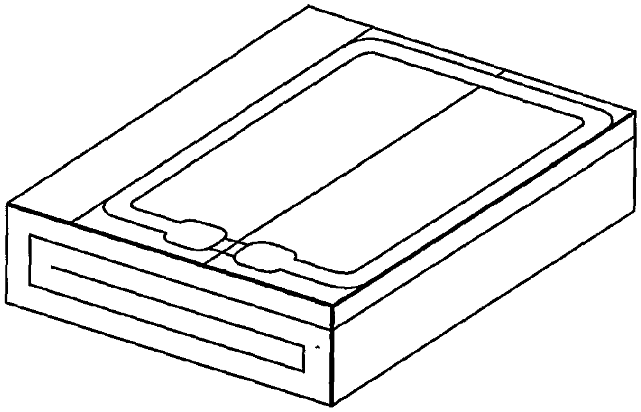
Figure 18B:
Figure 19:
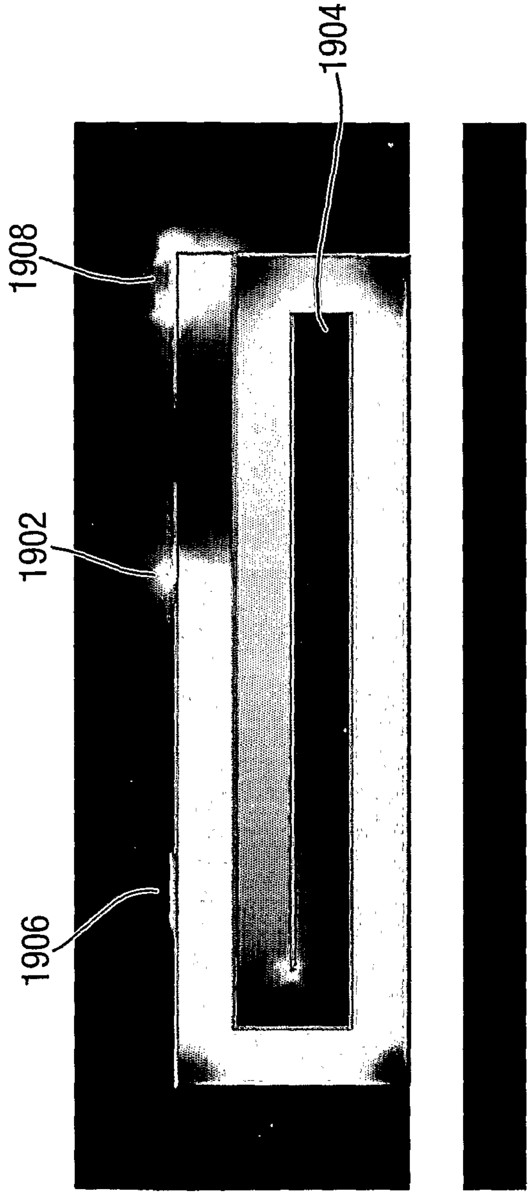
Figure 20:
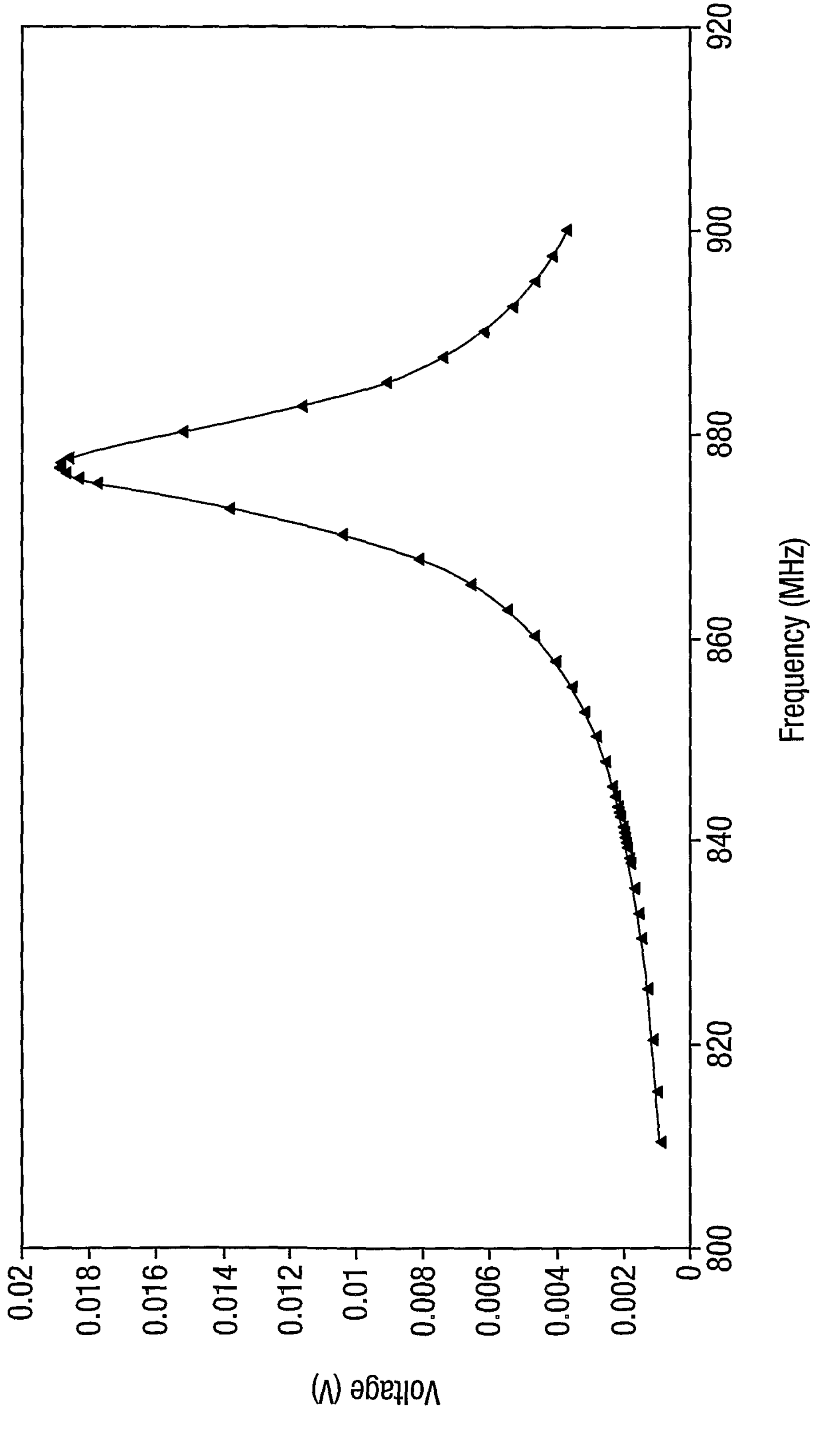

Equally the spiral structure of FIGS. 12 and 13 can be extended to four layers, as shown in analogous FIGS. 18 and 19. The same desired field characteristics (closed end 1904 close to zero; open end 1902 and loop ends 1906, 1908 having high field) are exhibited. The voltage across the chip is again plotted in FIG. 20.

Both FIGS. 16 and 19 again show localised areas of high electric field strength within the folded structure, at the edges of the conducting planes forming the internal corners of the dielectric cavity, which could act as tag mounting sites as explained above.

It will be understood that the present invention has been described above purely by way of example, and modification of detail can be made within the scope of the invention. Although the embodiment of FIG. 11 includes two dielectric layers at right angles to one another, it will be understood that the layers can equally be arranged at other angles such as 45 or 30 degrees, or combinations thereof. Examples of the positioning of electronic devices on mounting components have been provided, but it will be understood that alternative positions and orientations exist which advantageously experience electric field enhancement.

Each feature disclosed in the description, and (where appropriate) the claims and drawings may be provided independently or in any appropriate combination.

The invention claimed is:

1. Apparatus comprising a resonant dielectric cavity defined between conducting surfaces, adapted to enhance an electromagnetic field at the edge of one of said conducting surfaces, wherein said dielectric cavity is non-planar.

2. Apparatus according to claim 1, wherein said dielectric cavity comprises two or more dielectric layers defined between conducting walls.

3. Apparatus according to claim 2, wherein said layers are offset from one another.

4. Apparatus according to claim 2, wherein said layers are angled with respect to one another.

5. Apparatus according to claim 2, wherein said layers are joined at the ends thereof.

6. Apparatus according to claim 1, wherein said cavity has a unique path length.

7. Apparatus according to claim 6, wherein said dielectric cavity is substantially 'C shaped in cross section.

8. Apparatus according to claim 6, wherein said dielectric cavity is substantially 'S' shaped in cross section.

9. Apparatus according to claim 6, wherein said dielectric cavity is substantially spiral shaped in cross section.

10. Apparatus according to claim 1, wherein said cavity has multiple path lengths.

11. A mounting component for an electronic device comprising a first dielectric layer arranged between first and second conductor layers, and a second dielectric layer arranged between said second conductor layer and a third conductor layer, said first and third conductor layers being electrically connected at one end, thereby defining a first dielectric connecting region, joining said first and second dielectric layers, wherein said mounting component is adapted to enhance an electromagnetic field at a mounting site at an open edge of said third conductor layer.

12. A mounting component according to claim 11, wherein said first and second conductor layers are electrically connected by an end wall, opposite said connecting region.

13. A mounting component according to claim 11, further comprising a third dielectric layer arranged between said third conductor layer and a fourth conductor layer, said second and third dielectric layer being joined by a second connecting region opposite said first connecting region.

14. A component according to claim 11, comprising an EM tag located at least partially in said area of field enhancement.

15. A component according to claim 14, wherein said tag is electrically isolated from said conductor layers or surfaces.

16. A component according to claim 14, wherein said tag is powered by differential capacitive coupling.

17. A component according to claim 14, wherein the EM tag is a low Q RFID tag.

18. A component according to claim 11, wherein the total thickness of the component or decoupler is less than λ/4, or λ/10, or λ/300 or λ/1000, where λ is the intended wavelength of operation.

19. A component according to claim 11 wherein the total thickness of the component is 1 mm or less, or 500 μm or less, or 200 μm or less.

20. A component according to claim 11, wherein said electromagnetic field is enhanced by a factor greater than or equal to 50, 100, or 200.

* * * * *